(12) United States Patent
Martin-Bragado (10) Patent No.: US 11,908,095 B2
(45) Date of Patent: Feb. 20, 2024

(54) 2-D IMAGE RECONSTRUCTION IN A 3-D SIMULATION

(71) Applicant: GM CRUISE HOLDINGS LLC, San Francisco, CA (US)

(72) Inventor: Ignacio Martin-Bragado, Mountain View, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 193 days.

(21) Appl. No.: 17/527,867

(22) Filed: Nov. 16, 2021

(65) Prior Publication Data

US 2023/0154127 A1 May 18, 2023

(51) Int. Cl.
*G06T 19/20* (2011.01)
*G06T 19/00* (2011.01)
*G06F 16/587* (2019.01)
*G06T 17/00* (2006.01)

(52) U.S. Cl.
CPC ............ *G06T 19/20* (2013.01); *G06F 16/587* (2019.01); *G06T 17/00* (2013.01); *G06T 19/003* (2013.01); *G06T 2219/2004* (2013.01)

(58) Field of Classification Search
CPC .......... G06T 7/00; G06T 15/20; G06T 17/00; G06T 19/003; G06T 19/20; G06T 2219/2004; G06T 7/50; G06T 7/66; G06T 7/70; G06T 2207/10016; G06T 2207/20081; G06T 2207/20084; G06T 2207/30252; G06F 16/587
See application file for complete search history.

(56) References Cited

U.S. PATENT DOCUMENTS

| 2014/0028842 A1* | 1/2014 | Abramson | G06V 20/52 348/143 |
| 2017/0210383 A1* | 7/2017 | Nishimura | B60W 30/09 |
| 2022/0114406 A1* | 4/2022 | Wyffels | G06F 18/24155 |

OTHER PUBLICATIONS

Caesar, Holger, et al. "nuScenes: A multimodal dataset for autonomous driving." arXiv preprint arXiv:1903.11027v5 (May 2020). (Year: 2020).*

(Continued)

*Primary Examiner* — Daniel F Hajnik
(74) *Attorney, Agent, or Firm* — Novak Druce Carroll LLP (57) ABSTRACT

The present technology is directed to presenting a 3-D representation of an object, which is captured in a 2-D image of the object in an environment in a 3-D simulation of the environment. The present technology can receive 3-D data representing the environment including image data of the object in the environment, and a label identifying the object. The present technology can further locate a position of the object in the 3-D simulation of the environment based on determining a depth and an orientation of the object in the environment based on a semantic database of attributes associated with the object, obtain a 3-D representation of the object from the semantic database of attributes associated with the object, and project the 3-D representation of the object into the 3-D simulation of the environment at the determined position for the object.

17 Claims, 6 Drawing Sheets

(56) References Cited

OTHER PUBLICATIONS

Song, Xibin, et al. "ApolloCar3D: A Large 3D Car Instance Understanding Benchmark for Autonomous Driving." arXiv preprint arXiv: 1811.12222v2 (Nov. 2018) (Year: 2018).*

Rybski, Paul E., et al. "Visual classification of coarse vehicle orientation using histogram of oriented gradients features." 2010 IEEE Intelligent vehicles symposium. IEEE, 2010. (Year: 2010).*

* cited by examiner

2-D IMAGE RECONSTRUCTION IN A 3-D SIMULATION

TECHNICAL FIELD

The subject matter of this disclosure relates in general to the field of image reconstruction, and more particularly, to systems and methods for presenting a 3-D representation of an object, which was captured in a 2-D image of the object in an environment, in a 3-D simulation of the environment.

BACKGROUND

Autonomous vehicles (AVs) are vehicles having computers and control systems that perform driving and navigation tasks that are conventionally performed by a human driver. As AV technologies continue to advance, a real-world simulation for AV testing has been critical in improving the safety and efficiency of AV driving.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

SUMMARY

Disclosed are systems, apparatuses, methods, computer-readable medium, and circuits for presenting a 3-D representation of an object, which was captured in a 2-D image of the object in an environment, in a 3-D simulation of the environment.

According to at least one example, a method includes receiving 3-D data representing the environment where the 3-D data representing the environment includes a bounding box showing an approximate location of the object in the environment, image data of a visual representation of the object in the environment, and a label identifying the object. The method also includes locating a position of the object in the 3-D simulation of the environment created from the received 3-D data representing the environment based on determining an average measurement of the object, a depth of the object in the environment, and an orientation of the object in the environment based on a semantic database of attributes associated with the object.

Furthermore, the method includes obtaining a 3-D representation of the object from the semantic database of attributes associated with the object and projecting the 3-D representation of the object into the 3-D simulation of the environment at the determined position for the object. The method further includes training an object identification model based on the 3-D representation of the object.

In another example, a system for presenting a 3-D representation of an object captured in a 2-D image of the object in an environment in a 3-D simulation of the environment is provided that includes a storage (e.g., a memory configured to store data, such as virtual content data, one or more images, etc.) and one or more processors (e.g., implemented in circuitry) coupled to the memory and configured to execute instructions and, in conjunction with various components (e.g., a network interface, a display, an output device, etc.), cause the system to receive 3-D data representing the environment where the 3-D data representing the environment includes a bounding box showing an approximate location of the object in the environment, image data of a visual representation of the object in the environment, and a label identifying the object, locate a position of the object in the 3-D simulation of the environment created from the received 3-D data representing the environment based on determining an average measurement of the object, a depth of the object in the environment, and an orientation of the object in the environment based on a semantic database of attributes associated with the object, obtain a 3-D representation of the object from the semantic database of attributes associated with the object, and project the 3-D representation of the object into the 3-D simulation of the environment at the determined position for the object.

A non-transitory computer-readable storage medium having stored therein instructions which, when executed by one or more processors, can cause the one or more processors to receive 3-D data representing the environment where the 3-D data representing the environment includes a bounding box showing an approximate location of the object in the environment, image data of a visual representation of the object in the environment, and a label identifying the object, locate a position of the object in the 3-D simulation of the environment created from the received 3-D data representing the environment based on determining an average measurement of the object, a depth of the object in the environment, and an orientation of the object in the environment based on a semantic database of attributes associated with the object, obtain a 3-D representation of the object from the semantic database of attributes associated with the object, and project the 3-D representation of the object into the 3-D simulation of the environment at the determined position for the object.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Generally, road data (e.g., image data or other types of data representing a scene/environment) has been used in re-creating or simulating real-world scenes for vehicles. Not all data, however, provide 3-D information such as absolute 3-D positions of objects that can accurately localize every object in the scene in the simulation of the scene. For example, 2-D image data (e.g., collected through cameras) lack depth and orientation information associated with an object so that it may be difficult to place the object accurately in the simulation. Furthermore, 2-D image data is in a different coordinate system (e.g., x, y, z coordinates) that needs to be inverted into a coordinate system pertinent to 3-D data.

Aspects of the disclosed technology address the foregoing limitations by providing solutions for presenting a 3-D representation of an object, which was captured in a 2-D image of the object in an environment, in a 3-D simulation of the environment. In some examples, the 3-D simulation of the environment is created from 3-D data obtained by Light Detection and Ranging (LiDAR) or other sensors, but not all data is captured by sensors that provide 3-D information. Accordingly, a challenge exists to accurately locate an object captured in 2-D data in a 3-D simulation of the environment that is created by combining the 2-D data and 3-D data. The disclosed technology improves the location and presentation of the 2-D object in the 3-D simulation. By way of example, a 2-D image of an object in an environment can be translated to a 3-D representation of the object based on a semantic database of attributes associated with the object (or similar objects or a category of the object) so that the 3-D representation of the object can be accurately projected into the 3-D simulation of the environment.

It is understood that, as used herein, 3-D data for creating a 3-D simulation can include various types of data regarding driving scenarios, such as various types of sensor data, map data, and/or weather data, etc. Furthermore, depending on the desired implementation, the 3-D data may be stored in various different formats, or in different data structures, without departing from the scope of the disclosed technology.

DESCRIPTION

Figure 1:
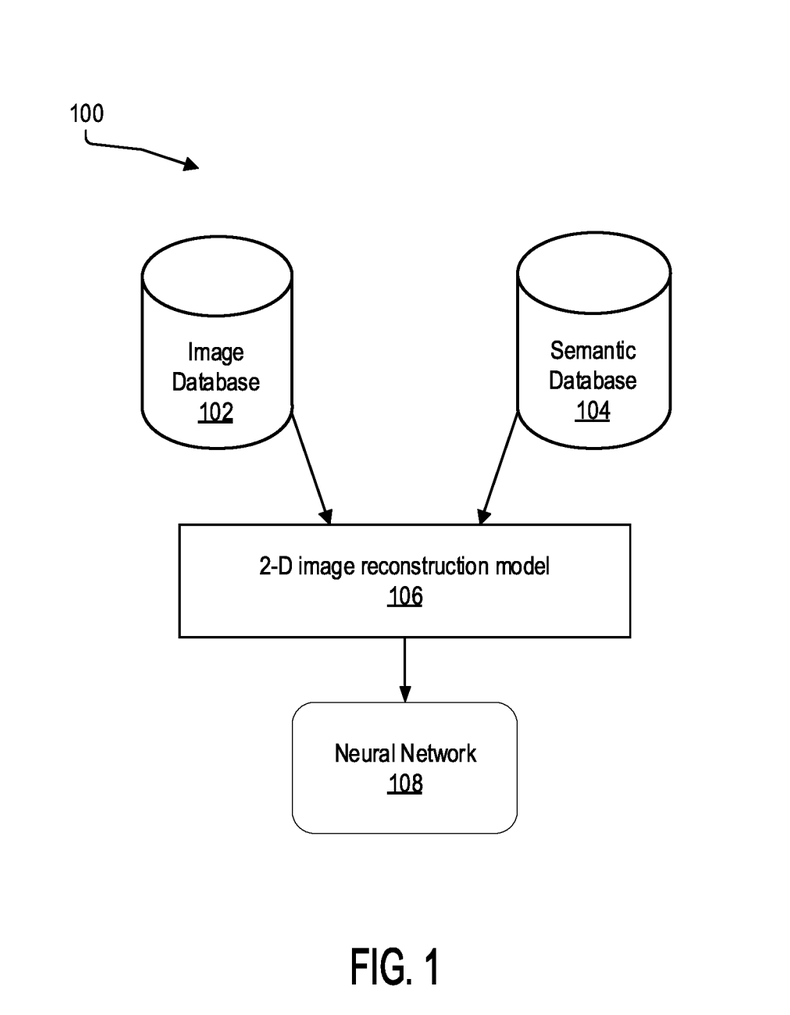
FIG. 1 illustrates an example 2-D image reconstruction system for presenting a 3-D representation of an object, which was captured in a 2-D image of the object in an environment, in a 3-D simulation of the environment according to some aspects of the disclosed technology.

FIG. 1 illustrates an example 2-D image reconstruction system 100 for presenting a 3-D representation of an object, which was captured in a 2-D image of the object in an environment, in a 3-D simulation of the environment, according to some aspects of the present technology. The 2-D image reconstruction system 100 can be implemented in various computing systems used to create and run simulations of 3-D environments.

In the example of FIG. 1, the 2-D image reconstruction system 100 can be configured to receive image data from image database 102 and semantic data from semantic database 104.

In some instances, image database 102 may include geographic, spatial, and/or geospatial data from multiple domains (e.g., images, Light Detection and Ranging (LiDAR) point clouds, Radio Detection and Ranging (RADAR) data, Global Positioning System (GPS) data, ultrasonic data, etc.). In some examples, the image data can be captured by cameras, RADAR and/or LiDAR sensors, or any suitable image sensors, which can be internal or external to a vehicle.

In some examples, the image data from image database 102 can include a 3-D image that represents an environment or a place, for example, streets, freeways, lanes, crosswalks, sidewalks, intersections, parks, terminals, parking lots, etc. The 3-D data representing the environment can include various objects represented in 3-D. Such objects may include physical things/objects (e.g., vehicles, pedestrians, traffic signal poles, traffic signs, construction cones, buildings, trees, parking meters, etc.)

In some examples, some of the objects in the environment cannot be accurately located nor visually represented in the 3-D data. Additionally, or alternatively, it may be desired to place an object in the environment that was not previously represented or otherwise captured by the 3-D data but was captured using 2-D data. In such examples, the 3-D data can include a bounding box that shows an approximate location of an object in the environment, image data of a visual representation of the object in the environment, and/or a label identifying the object, for example, to indicate a type of the object or object classification.

In some examples, since the object represented with 2-D image data lacks sufficient information to be represented in 3-D (e.g., it is not possible to accurately determine depth or an orientation of the object in the environment from a 2-D image), 2-D image reconstruction model 106 may determine feasible values for such missing data based on semantic database 104, which includes semantic information of attributes associated with the object.

In some instances, semantic database 104 includes a set of assumptions, correlations (e.g., indicating objects and relationships among the objects in the environment), rules, contextual information, approximations (e.g., mean values), and/or algorithms that are related to attributes of the object. In some examples, semantic data may be a set of polygons or geometrical figures that include description of what is encapsulated in the semantic data (e.g., figures, areas, or objects that are included in a map, such as sidewalk, parking spaces, lanes, parks, etc.). By way of example, semantic data can include a set of assumptions relating to motion and behavior of various vehicles and/or pedestrians in a given environment (e.g., a direction of the flow of traffic on a one-way street, placement of construction cones near the construction zones, pedestrians walking on a pedestrian road or crossing a crosswalk, etc.).

According to some examples, a 3-D simulation of the environment can be created based on the 3-D data in image database 102, which, for example, can be used for test driving an autonomous vehicle (AV). With accurate and high-quality 3-D data, a more accurate 3-D simulation of the environment can be created that is identical to, or nearly identical to, the original environment.

In some examples, in order to enhance the 3-D simulation of the environment, 2-D image reconstruction system 100 can reconstruct the 2-D image data of the object and locate a position of the object in the 3-D simulation of the environment so that a 3-D representation of the object, which is provided with 2-D image data can be accurately projected into the 3-D simulation of the environment.

In some instances, in order to locate the position of the object in the 3-D simulation of the environment, 2-D image reconstruction model 106 can translate a coordinate system based on the 2-D image into a coordinate system based on the 3-D simulation of the environment (i.e., perform an inversion of coordinates). For instance, 2-D image reconstruction model 106 can determine an average measurement of the object (such as height, length, width), and using the average measurement can determine a depth of the object in the environment, and an orientation of the object in the environment based on semantic database 104. As such, the coordinates of the objects for the 3-D simulation of the environment can be obtained based on the depth and orientation of the object in the environment. In some examples, an average width or any other applicable average dimension of the object can be used in a similar fashion to determine the depth of the object in the environment and the orientation of the object in the environment based on semantic database 104.

In particular, the average height of the object can be determined based on a value stored in the semantic database 104 including attributes associated with the object. In some instances, semantic database 104 may provide a mean value of the height for the type of the object. For example, if the label identifies the object as a construction cone, an average height of the construction zone can be determined based on a mean value of height for a typical construction zone stored in semantic database 104. In some examples, other applicable values in determining an average height (or width) of the object can be used in a similar fashion. For example, semantic database 104 may store a mean value, a median value, and/or mode value for the type of the object, which may be used in determining an average height (or width) of the object.

Furthermore, the depth of the object in the environment can be determined based on a comparison of the average height of the object and an apparent height of the object in the 2-D image. In some instances, the average height of the object determined based on semantic database 104 can be compared with the apparent height of the object, which can be an actual height of the object in the captured 2-D image of the object in the environment. Based on the comparison, the depth of the object in the environment can be determined.

Also, the orientation of the object in the environment can be determined based on the type of the object (e.g., object classification) and the approximate location of the object in the environment. In some instances, semantic database 104 may provide where a typical object needs to be oriented based on the approximate location of the object in the environment as shown in the bounding box in the 3-D data. For example, semantic database 104 may provide a direction of the flow of traffic at a certain location in the environment. Accordingly, an orientation and a position of the object in the environment can be determined (e.g., where the object is facing).

Furthermore, semantic database 104 may provide where a particular object needs to be located so that an accurate location of the object in the environment can be determined. For example, semantic database 104 may comprise logical information relating to a location of an object, such as a construction cone may be located near a construction zone or a tree may be located near a park or on the sidewalk, but not in the middle of the road or freeway.

According to some examples, 2-D image reconstruction system 100 can obtain a 3-D representation (e.g., 3-D visual representation) of the object based on the semantic database 104. In some instances, semantic database 104 may provide a 3-D visual representation of the typical object.

In some instances, based on the determined depth and orientation of the object in the environment, the 3-D representation of the object can be projected into the 3-D simulation of the environment, which is created based on the 3-D data of the environment.

According to some examples, 2-D image reconstruction system 100 can further include neural network 108 (e.g., object identification model) that can be trained based on the 3-D representation of the object generated by 2-D image reconstruction model 106. In some examples, machine learning models (e.g., neural network 108) can be trained to further understand the context included in the 2-D image. For instance, a better estimation of the height of the object captured in the 2-D image can be obtained based on the machine learning models. Similarly, machine learning models may infer if the object is fully seen or overlapping with another object and provide the percentage of the coverage or exposed portion. Such additional information can be used to refine the placement of the object in the 3-D simulation.

Figure 2A:
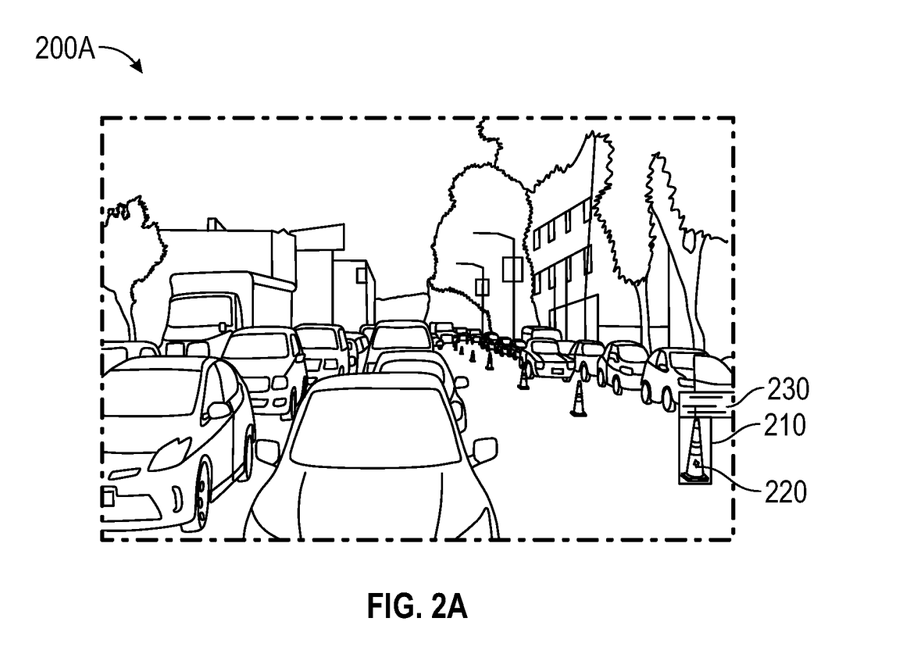
FIGS. 2A-2C illustrate example 3-D data representing an environment and example 3-D simulations of the environment based on the 3-D data with or without a placement of an object, according to some aspects of the disclosed technology.
Figure 2B:
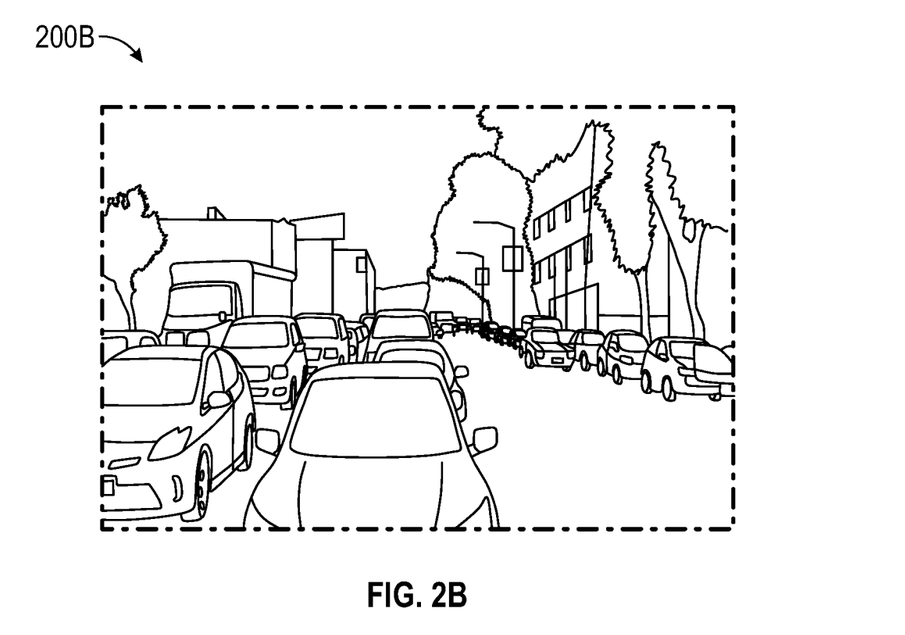
Figure 2C:
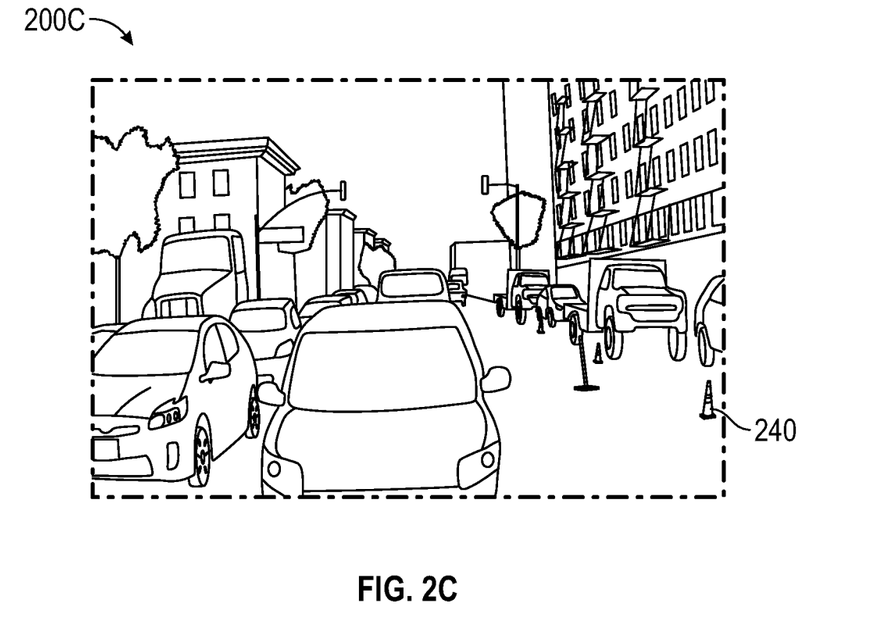

FIGS. 2A-2C illustrate an example 3-D data representing an environment and example 3-D simulations of the environment based on the 3-D data with or without a placement of an object, according to some aspects of the disclosed technology.

FIG. 2A illustrates an example 3-D data 200A representing an environment (e.g., a one-way street). While various objects may be represented in 3-D, in some examples, 3-D data of the one-way street 200A comprises a bounding box 210 showing an approximate location of the object in the environment, image data 220 of a visual representation of the object in the environment, and a label 230 identifying the object (e.g., a construction cone).

In the example of FIG. 2A, a construction cone is captured in the 2-D image data 220. For example, bounding box 210 enclosing the construction cone may indicate where the construction cone is approximately located on the one-way street. While a box is used in FIG. 2A, any other shape or marking can be used to indicate the approximate location of the object in the environment. Further, image data 220 of the visual representation of the construction cone may be included in 3-D data of the one-way street 200A. Also, label 230 can indicate what type of the object is, for example, a construction cone.

FIG. 2B illustrates an example 3-D simulation of the one-way street 200B, which may be created based on the 3-D data of the one-way street 200A where the construction cone was not present or was otherwise not captured in sufficient detail to render the construction cone from the 3-D data.

FIG. 2C illustrates an example 3-D simulation of the one-way street 200C with the placement of the construction cone 240 based on a combination of the 3-D data of the one-way street 200A and the 2-D image data 220 of the visual representation of the construction cone. In the example of FIG. 2B, once the depth and the orientation are determined based on a semantic database of attributes associated with the object (e.g., semantic database 104 as illustrated in FIG. 1), the construction cone 240, which is captured in the image data 220 in FIG. 2A may be located and rendered in the 3-D simulation of the one-way street 200C of the environment.

Figure 3:
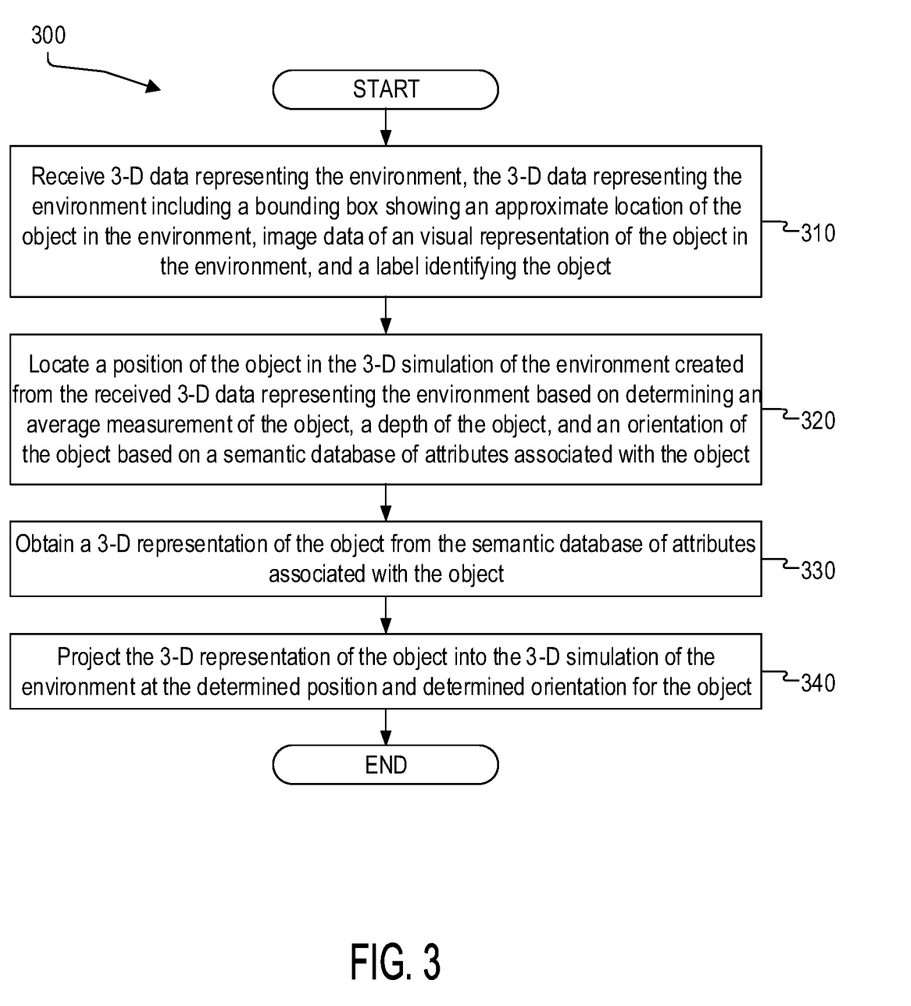
FIG. 3 is a flowchart of a method for presenting a 3-D representation of an object, which was captured in a 2-D image of the object in an environment in a 3-D simulation of the environment according to some aspects of the disclosed technology.

FIG. 3 illustrates an example method 300 for presenting a 3-D representation of an object captured in a 2-D image of the object in an environment in a 3-D simulation of the environment. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

According to some examples, the method 300 includes receiving 3-D data representing the environment where the 3-D data representing the environment has been enhanced with a bounding box showing an approximate location of the object in the environment, image data of a visual representation of the object in the environment, and a label identifying the object at step 310. For example, the 2-D image reconstruction system 100 illustrated in FIG. 1 may receive 3-D data representing the environment where the 3-D data representing the environment including a bounding box showing an approximate location of the object in the environment (e.g., bounding box 210 in FIG. 2A), image data of a visual representation of the object in the environment (e.g., image data of the visual representation of the object 220 in FIG. 2A), and a label identifying the object (e.g., label 230 in FIG. 2A).

In some examples, the 3-D data can be of various types, including but not limited to LiDAR data, radar data, sonar data, and/or camera data, and the like, which may be captured by different types of image sensors. The 3-D data can be further a combination of image data and other data such as location/map data that can be used to reconstruct a 3-D real-world simulation encountered by vehicles (e.g., AVs).

In some examples, the 3-D data representing the environment does not include a representation of the object. For example, 3-D data representing the environment may include various objects such as vehicles, pedestrians, traffic signal poles, traffic signs, construction cones, buildings, trees, parking meters. While some of the objects can be represented in 3-D with an accurate localization in the environment, the 3-D data may not include representation of other objects that cannot be precisely located in a 3-D simulation of the environment.

In some other examples, the 3-D data representing the environment does not include a representation of the object sufficient to locate and orient the object in a 3-D simulation of the environment. For example, the 3-D data may include some information relating to the object represented in the environment, but not sufficient to locate and orient the object in the 3-D simulation of the environment.

According to some examples, the method 300 includes locating a position of the object in the 3-D simulation of the environment created from the received 3-D data representing the environment at step 320 based on determining an average measurement of the object, a depth of the object in the environment, and an orientation of the object in the environment based on a semantic database of attributes associated with the object.

For example, the 2-D image reconstruction system 100 illustrated in FIG. 1 may locate a position of the object (e.g., construction cone shown in FIG. 2A) in the 3-D simulation of the environment (e.g., 3-D simulation of the one-way street 200B in FIG. 2B) created from the received 3-D data representing the environment (e.g., 3-D data of the one-way street 200A in FIG. 2A) based on determining an average measurement of the object, a depth of the object in the environment, and an orientation of the object in the environment based on a semantic database of attributes associated with the object (e.g., semantic database 104 as illustrated in FIG. 1).

In some examples, the semantic database of attributes associated with the object includes a set of assumptions and contextual information that provide an approximate value for the depth and the orientation for the type of the object. As described with respect to FIG. 1, semantic data can include a set of assumptions, correlations (e.g., indicating objects and relationships among the objects in the environment, relative dimensions comparing to other objects in the environment), rules, contextual information, approximations (e.g., mean values for dimensions of the type of the object), or algorithms that are related to attributes of the object.

In some instances, the average measurement of the object can be determined based on a value stored in the semantic database of attributes associated with the object. For example, the 2-D image reconstruction system 100 illustrated in FIG. 1 may determine the average measurement of the object (e.g., construction cone identified in label 230 illustrated in FIG. 2A) based on a value stored in the semantic database of attributes associated with the object (e.g., semantic database 104 in FIG. 1).

Further, the depth of the object in the environment can be determined based on a comparison of the average measurement of the object and an apparent measurement of the object in the 2-D image. For example, the 2-D image reconstruction system 100 illustrated in FIG. 1 may determine the depth of the object in the environment based on a comparison of the average measurement of the object as provided by the semantic database and an apparent measurement of the object as captured in the 2-D image.

Furthermore, the orientation of the object in the environment can be determined based on the type of the object (e.g., object classification) and the approximate location of the object in the environment. For example, the 2-D image reconstruction system 100 illustrated in FIG. 1 may determine the orientation of the object in the environment based on the type of the object and the approximate location of the object in the environment.

In some examples of the determining the orientation of the object in the environment, the method 300 comprises determining that the object is oriented in a direction in-line with traffic when the object occurs within a road boundary in the environment. For example, the 2-D image reconstruction system 100 illustrated in FIG. 1 may determine that the object is oriented in a direction in-line with traffic when the object occurs within a road boundary in the environment.

In another example of the determining the orientation of the object in the environment, the method 300 comprises determining that the object is located outside of a road boundary in the environment. For example, the 2-D image reconstruction system 100 illustrated in FIG. 1 may determine that the object is located outside of a road boundary in the environment.

Further, the method 300 comprises, when the object is located outside of the road boundary in the environment, determining an orientation heuristic associated with the object in the semantic database of attributes associated with the object. For example, the 2-D image reconstruction system 100 illustrated in FIG. 1 may determine an orientation heuristic associated with the object in the semantic database of attributes associated with the object. In some examples, the orientation of the object may be determined by the orientation heuristic.

In another example of the determining the orientation of the object in the environment, the method 300 comprises determining that the object is located outside of a road boundary in the environment. For example, the 2-D image reconstruction system 100 illustrated in FIG. 1 may determine that the object is located outside of a road boundary in the environment.

Further, the method 300 comprises, when the object is located outside of the road boundary in the environment, determining an orientation attribute associated with the object in the semantic database of attributes associated with the object. For example, the 2-D image reconstruction system 100 illustrated in FIG. 1 may determine an orientation attribute associated with the object in the semantic database of attributes associated with the object (e.g., semantic database 104 in FIG. 1). In some examples, the orientation attribute may define an approximate orientation of the object with respect to the road boundary.

According to some examples, the locating the position of the object in the 3-D simulation of the environment is based on 3-D image data of other object(s) included in the 3-D data representing the environment. For example, the 2-D image reconstruction system 100 may determine the position of the object including the depth or orientation of the object in the environment based on 3-D image data of other objects(s) such as cars, buildings, trees, or parking meters whose localization information for the 3-D simulation is provided in the 3-D image data. By way of example, based on the distance between the object (e.g., construction cone in FIG. 2A) and a traffic light pole in the environment, the height of the object can be determined relative to the height of the traffic light pole. By comparing the measurement of the object determined based on 3-D image data of other objects and apparent measurement captured in the 2-D image data, the depth of the object in the environment can be determined for the 3-D simulation of the environment.

According to some examples, the method 300 comprises determining if the 3-D representation of the object projected into the 3-D simulation of the environment overlaps with another object located in the 3-D simulation of the environment. For example, the 2-D image reconstruction system 100 illustrated in FIG. 1 may determine if the 3-D representation of the object (e.g., construction cone 240 illustrated in FIG. 2B) projected into the 3-D simulation of the environment (e.g., 3-D simulation of the one-way street 200B in FIG. 2B) overlaps with another object located in the 3-D simulation of the environment such as cars, buildings, etc.

In some examples, the determining if the 3-D representation of the object overlaps with the another object includes measuring a distance between a footprint of the 3-D representation of the object projected into the 3-D simulation and a footprint of the another object.

According to some examples, the method 300 comprises determining if a centroid of the 3-D representation of the object projected into the 3-D simulation of the environment is within a region. In some examples, the region is defined based on a set of assumptions and contextual information for the type of the object stored in the semantic database of attributes associated with the object. For example, the 2-D image reconstruction system 100 illustrated in FIG. 1 may determine if a centroid of the 3-D representation of the object (e.g., construction cone 240 illustrated in FIG. 2B) projected into the 3-D simulation of the environment (e.g., 3-D simulation of the one-way street 200B in FIG. 2B) is within a region defined based on semantic data associated with the object stored in a semantic database (e.g., semantic database 104 in FIG. 1).

In some examples, the method 300 comprises in response to a determination that the 3-D representation of the object overlaps with the another object or a determination that the centroid of the 3-D representation of the object is not within the region, adjusting the depth of the object by a predetermined increment or decrement. The placement of the 3-D representation of the object in the 3-D simulation of the environment can continue to be adjusted by a predetermined increment or decrement until it satisfies that the 3-D simulation of the object does not overlap with another object and that the centroid of the 3-D representation of the object is not within the region. For example, the 2-D image reconstruction system 100 illustrated in FIG. 1 may in response to a determination that the 3-D representation of the object (e.g., construction cone 240 illustrated in FIG. 2B) overlaps with the another object (e.g., cars, trees, buildings, traffic light poles, etc.) or a determination that the centroid of the 3-D representation of the object (e.g., construction cone 240 illustrated in FIG. 2B) is not within the region, adjust the depth of the object by a predetermined increment or decrement until it can accurately place the object in the 3-D simulation of the environment.

According to some examples, the method 300 includes obtaining a 3-D representation of the object from the semantic database of attributes associated with the object at step 330. For example, the 2-D image reconstruction system 100 illustrated in FIG. 1 may obtain a 3-D representation of the object (e.g., construction cone) from the semantic database (e.g., semantic database 104 in FIG. 1) of attributes associated with the object. In some instances, the label identifying the object (e.g., label 230 illustrated in FIG. 2A) can indicate the type of the object or object classification. Based on the label, a general 3-D visual representation of the object, which visually represents most similar to the object captured in the 2-D image, can be obtained from the semantic database (e.g., semantic database 104 in FIG. 1) to be projected into the 3-D simulation of the environment.

According to some examples, the method 300 includes projecting the 3-D representation of the object into the 3-D simulation of the environment at the determined position for the object at step 340. For example, the 2-D image reconstruction system 100 illustrated in FIG. 1 may project the 3-D representation of the object (e.g., 3-D representation of the construction cone 240 illustrated in FIG. 2B) into the 3-D simulation of the environment (e.g., 3-D simulation of the one-way street 200B in FIG. 2B) at the determined position for the object.

According to some examples, the method further includes training an object identification model based on the 3-D representation of the object. For example, the 2-D image reconstruction system 100 illustrated in FIG. 1 may train an object identification model (e.g., neural network 108 in FIG. 1) based on the 3-D representation of the object.

Figure 4:
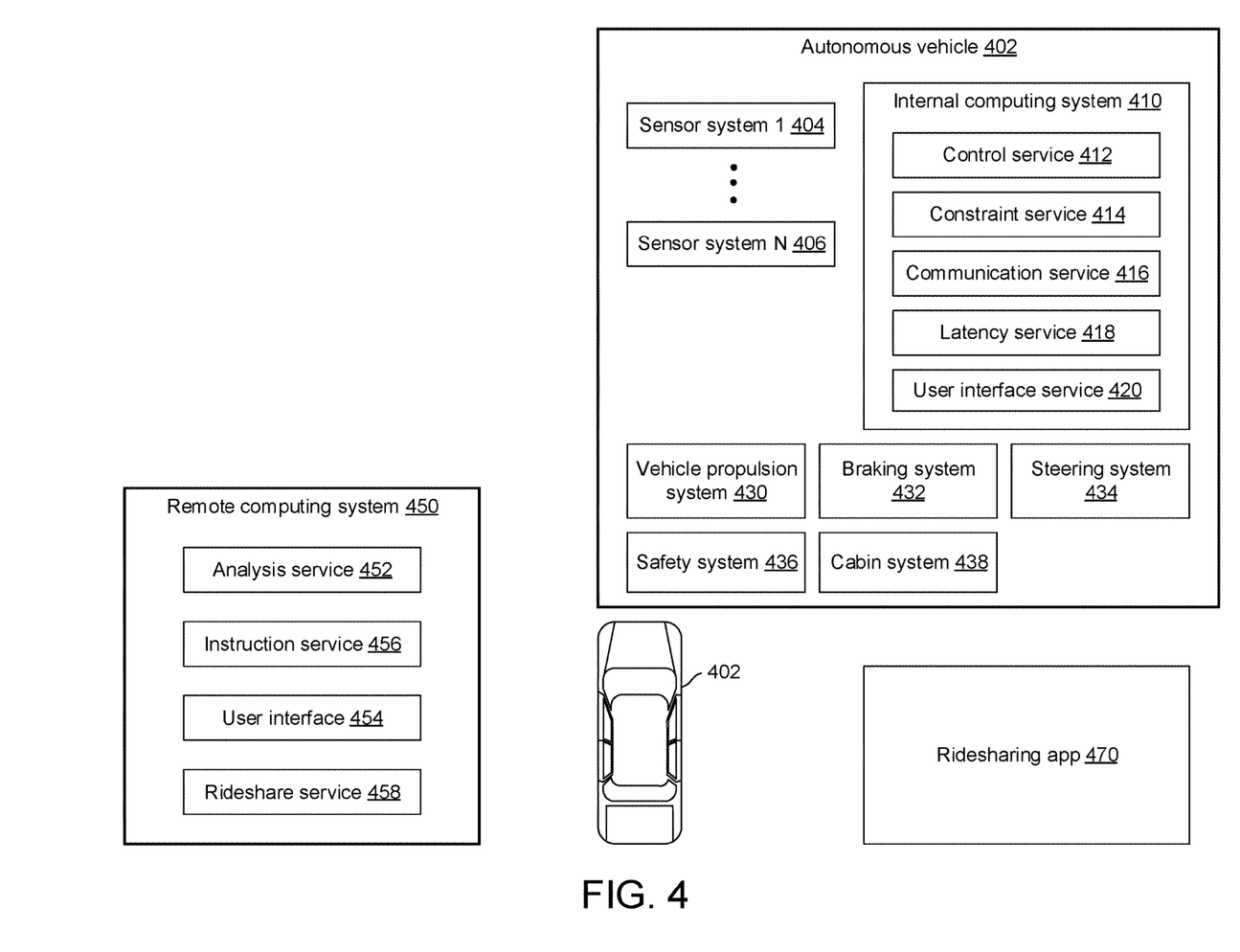
FIG. 4 illustrates an example autonomous vehicle environment including a computing system in communication with an autonomous vehicle, in accordance with some examples.

FIG. 4 illustrates environment 400 that includes an autonomous vehicle 402 in communication with a computing system 450.

The autonomous vehicle 402 can navigate about roadways without a human driver based upon sensor signals output by sensor systems 404-406 of the autonomous vehicle 402. The autonomous vehicle 402 includes a plurality of sensor systems 404-406 (a first sensor system 404 through an Nth sensor system 406). The sensor systems 404-406 are of different types and are arranged about the autonomous vehicle 402. For example, the first sensor system 404 may be a camera sensor system and the Nth sensor system 406 may be a lidar sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 402 further includes several mechanical systems that are used to effectuate appropriate motion of the autonomous vehicle 402. For instance, the mechanical systems can include but are not limited to, a vehicle propulsion system 430, a braking system 432, and a steering system 434. The vehicle propulsion system 430 may include an electric motor, an internal combustion engine, or both. The braking system 432 can include an engine brake, brake pads, actuators, and/or any other suitable componentry that is configured to assist in decelerating the autonomous vehicle 402. The steering system 434 includes suitable componentry that is configured to control the direction of movement of the autonomous vehicle 402 during navigation.

The autonomous vehicle 402 further includes a safety system 436 that can include various lights and signal indicators, parking brake, airbags, etc. The autonomous vehicle 402 further includes a cabin system 438 that can include cabin temperature control systems, in-cabin entertainment systems, etc.

The autonomous vehicle 402 additionally comprises an internal computing system 410 that is in communication with the sensor systems 404-406 and the mechanical systems 430, 432, 434. The internal computing system includes at least one processor and at least one memory having computer-executable instructions that are executed by the processor. The computer-executable instructions can make up one or more services responsible for controlling the autonomous vehicle 402, communicating with remote computing system 450, receiving inputs from passengers or human co-pilots, logging metrics regarding data collected by sensor systems 404-406 and human co-pilots, etc.

The internal computing system 410 can include a control service 412 that is configured to control operation of the vehicle propulsion system 430, the braking system 432, the steering system 434, the safety system 436, and the cabin system 438. The control service 412 receives sensor signals from the sensor systems 404-406 as well communicates with other services of the internal computing system 410 to effectuate operation of the autonomous vehicle 402. In some embodiments, control service 412 may carry out operations in concert one or more other systems of autonomous vehicle 402.

The internal computing system 410 can also include a constraint service 414 to facilitate safe propulsion of the autonomous vehicle 402. The constraint service 414 includes instructions for activating a constraint based on a rule-based restriction upon operation of the autonomous vehicle 402. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 412.

The internal computing system 410 can also include a communication service 416. The communication service can include both software and hardware elements for transmitting and receiving signals from/to the remote computing system 450. The communication service 416 is configured to transmit information wirelessly over a network, for example, through an antenna array that provides personal cellular (long-term evolution (LTE), 3G, 5G, etc.) communication.

In some embodiments, one or more services of the internal computing system 410 are configured to send and receive communications to remote computing system 450 for such reasons as reporting data for training and evaluating machine learning algorithms, requesting assistance from remoting computing system or a human operator via remote computing system, software service updates, ridesharing pickup and drop off instructions etc.

The internal computing system 410 can also include a latency service 418. The latency service 418 can utilize timestamps on communications to and from the remote computing system 450 to determine if a communication has been received from the remote computing system 450 in time to be useful. For example, when a service of the internal computing system 410 requests feedback from remote computing system 450 on a time-sensitive process, the latency service 418 can determine if a response was timely received from remote computing system 450 as information can quickly become too stale to be actionable. When the latency service 418 determines that a response has not been received within a threshold, the latency service 418 can enable other systems of autonomous vehicle 402 or a passenger to make necessary decisions or to provide the needed feedback.

The internal computing system 410 can also include a user interface service 420 that can communicate with cabin system 438 in order to provide information or receive information to a human co-pilot or human passenger. In some embodiments, a human co-pilot or human passenger may be required to evaluate and override a constraint from constraint service 414, or the human co-pilot or human passenger may wish to provide an instruction to the autonomous vehicle 402 regarding destinations, requested routes, or other requested operations.

As described above, the remote computing system 450 is configured to send/receive a signal from the autonomous vehicle 402 regarding reporting data for training and evaluating machine learning algorithms, requesting assistance from remoting computing system or a human operator via the remote computing system 450, software service updates, ridesharing pickup and drop off instructions, etc.

The remote computing system 450 includes an analysis service 452 that is configured to receive data from autonomous vehicle 402 and analyze the data to train or evaluate machine learning algorithms for operating the autonomous vehicle 402. The analysis service 452 can also perform analysis pertaining to data associated with one or more errors or constraints reported by autonomous vehicle 402.

The remote computing system 450 can also include a user interface service 454 configured to present metrics, video, pictures, sounds reported from the autonomous vehicle 402 to an operator of remote computing system 450. User interface service 454 can further receive input instructions from an operator that can be sent to the autonomous vehicle 402.

The remote computing system 450 can also include an instruction service 456 for sending instructions regarding the operation of the autonomous vehicle 402. For example, in response to an output of the analysis service 452 or user interface service 454, instruction service 456 can prepare instructions to one or more services of the autonomous vehicle 402 or a co-pilot or passenger of the autonomous vehicle 402.

The remote computing system 450 can also include a rideshare service 458 configured to interact with ridesharing applications 470 operating on (potential) passenger computing devices. The rideshare service 458 can receive requests to be picked up or dropped off from passenger ridesharing app 470 and can dispatch autonomous vehicle 402 for the trip. The rideshare service 458 can also act as an intermediary between the ridesharing app 470 and the autonomous vehicle wherein a passenger might provide instructions to the autonomous vehicle to 402 go around an obstacle, change routes, honk the horn, etc.

Figure 5:
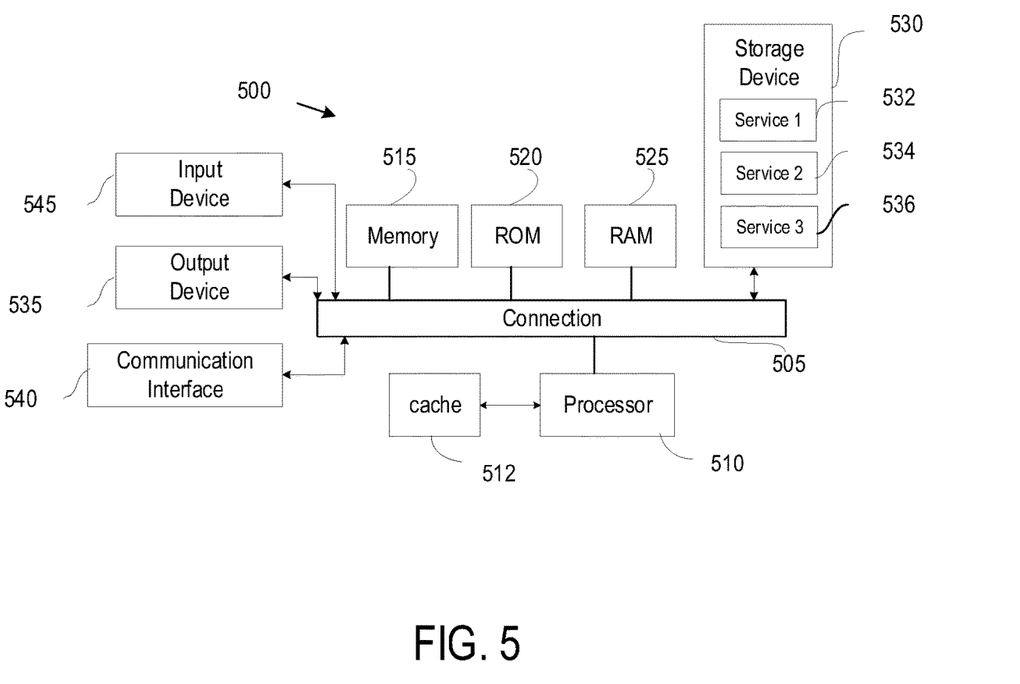
FIG. 5 shows an example of a computing system for implementing certain aspects of the present technology.

FIG. 5 shows an example of computing system 500, which can be for example any computing device making up a 2-D image reconstruction system 100, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random-access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A computer-implemented method for presenting a 3-D representation of an object, which was captured in a 2-D image of the object in an environment in a 3-D simulation of the environment, the method comprising:
   receiving 3-D data representing the environment, the 3-D data representing the environment including a bounding box showing an approximate location of the object in the environment, image data of a visual representation of the object in the environment, and a label identifying the object;
   locating a position of the object in the 3-D simulation of the environment created from the received 3-D data representing the environment, the locating the position of the object in the 3-D simulation of the environment including:
      determining an average measurement of the object, a depth of the object in the environment, and an orientation of the object in the environment based on a semantic database of attributes associated with the object, wherein the determining the average measurement of the object, the depth of the object in the environment, and the orientation of the object in the environment based on the semantic database of attributes associated with the object includes determining the average measurement of the object based on a value stored in the semantic database of attributes associated with the object, determining the depth of the object in the environment based on a comparison of the average measurement of the object and an apparent measurement of the object in the 2-D image, and determining the orientation of the object in the environment based on a type of the object and the approximate location of the object in the environment;
   obtaining a 3-D representation of the object from the semantic database of attributes associated with the object; and
   projecting the 3-D representation of the object into the 3-D simulation of the environment at the determined position for the object.

2. The computer-implemented method of claim 1, further comprising:
   training an object identification model based on the 3-D representation of the object.

3. The computer-implemented method of claim 1, wherein the determining the orientation of the object in the environment comprises:
   determining that the object is oriented in a direction in-line with traffic when the object occurs within a road boundary in the environment.

4. The computer-implemented method of claim 1, wherein the determining the orientation of the object in the environment comprises:
   determining that the object is located outside of a road boundary in the environment; and
   determining an orientation heuristic associated with the object in the semantic database of attributes associated with the object, wherein the orientation of the object is determined by the orientation heuristic.

5. The computer-implemented method of claim 1, wherein the determining the orientation of the object in the environment comprises:
determining that the object is located outside of a road boundary in the environment; and
determining an orientation attribute associated with the object in the semantic database of attributes associated with the object,
wherein the orientation attribute defines an approximate orientation of the object with respect to the road boundary.

6. The computer-implemented method of claim 1, wherein the semantic database of attributes associated with the object includes a set of assumptions and contextual information that provide an approximate value for the depth and the orientation for a type of the object.

7. The computer-implemented method of claim 1, further comprising:
determining if the 3-D representation of the object projected into the 3-D simulation of the environment overlaps with another object located in the 3-D simulation of the environment; and
determining if a centroid of the 3-D representation of the object projected into the 3-D simulation of the environment is within a region, wherein the region is defined based on a set of assumptions and contextual information for a type of the object stored in the semantic database of attributes associated with the object.

8. The computer-implemented method of claim 7, further comprising:
in response to a determination that the 3-D representation of the object overlaps with the another object or a determination that the centroid of the 3-D representation of the object is not within the region, adjusting the depth of the object by a predetermined increment or decrement.

9. The computer-implemented method of claim 1, wherein the locating the position of the object in the 3-D simulation of the environment is based on 3-D image data of a 3-D object included in the 3-D data representing the environment.

10. A system for presenting a 3-D representation of an object captured in a 2-D image of the object in an environment in a 3-D simulation of the environment, the system comprising:
a storage configured to store instructions; and
a processor configured to execute the instructions and cause the processor to:
receive 3-D data representing the environment, the 3-D data representing the environment including a bounding box showing an approximate location of the object in the environment, image data of a visual representation of the object in the environment, and a label identifying the object,
locate a position of the object in the 3-D simulation of the environment created from the received 3-D data representing the environment, the locate the position of the object in the 3-D simulation of the environment including,
determine an average measurement of the object, a depth of the object in the environment, and an orientation of the object in the environment based on a semantic database of attributes associated with the object,
determine the average measurement of the object based on a value stored in the semantic database of attributes associated with the object,
determine the depth of the object in the environment based on a comparison of the average measurement of the object and an apparent measurement of the object in the 2-D image,
determine the orientation of the object in the environment based on a type of the object and the approximate location of the object in the environment,
obtain a 3-D representation of the object from the semantic database of attributes associated with the object, and
project the 3-D representation of the object into the 3-D simulation of the environment at the determined position for the object.

11. The system of claim 10, wherein the processor is configured to execute the instructions and cause the processor to:
train an object identification model based on the 3-D representation of the object.

12. The system of claim 10, wherein the processor is configured to execute the instructions and cause the processor to:
determine if the 3-D representation of the object projected into the 3-D simulation of the environment overlaps with another object located in the 3-D simulation of the environment; and
determine if a centroid of the 3-D representation of the object projected into the 3-D simulation of the environment is within a region, wherein the region is defined based on a set of assumptions and contextual information for a type of the object stored in the semantic database of attributes associated with the object.

13. The system of claim 12, wherein the processor is configured to execute the instructions and cause the processor to:
in response to a determination that the 3-D representation of the object overlaps with the another object or a determination that the centroid of the 3-D representation of the object is not within the region, adjust the depth of the object by a predetermined increment or decrement.

14. A non-transitory computer readable medium for presenting a 3-D representation of an object captured in a 2-D image of the object in an environment in a 3-D simulation of the environment, the non-transitory computer readable medium comprising instructions, the instructions, when executed by a computing system, cause the computing system to:
receive 3-D data representing the environment, the 3-D data representing the environment including a bounding box showing an approximate location of the object in the environment, image data of a visual representation of the object in the environment, and a label identifying the object;
locate a position of the object in the 3-D simulation of the environment created from the received 3-D data representing the environment, the locate the position of the object in the 3-D simulation of the environment including;
determine an average measurement of the object, a depth of the object in the environment, and an orientation of the object in the environment based on a semantic database of attributes associated with the object;

determine the average measurement of the object based on a value stored in the semantic database of attributes associated with the object;

determine the depth of the object in the environment based on a comparison of the average measurement of the object and an apparent measurement of the object in the 2-D image;

determine the orientation of the object in the environment based on a type of the object and the approximate location of the object in the environment;

obtain a 3-D representation of the object from the semantic database of attributes associated with the object; and project the 3-D representation of the object into the 3-D simulation of the environment at the determined position for the object.

15. The computer readable medium of claim 14, wherein the computer readable medium further comprises instructions that, when executed by the computing system, cause the computing system to:

train an object identification model based on the 3-D representation of the object.

16. The computer readable medium of claim 14, wherein the computer readable medium further comprises instructions that, when executed by the computing system, cause the computing system to:

determine if the 3-D representation of the object projected into the 3-D simulation of the environment overlaps with another object located in the 3-D simulation of the environment; and determine if a centroid of the 3-D representation of the object projected into the 3-D simulation of the environment is within a region, wherein the region is defined based on a set of assumptions and contextual information for a type of the object stored in the semantic database of attributes associated with the object.

17. The computer readable medium of claim 16, wherein the computer readable medium further comprises instructions that, when executed by the computing system, cause the computing system to:

in response to a determination that the 3-D representation of the object overlaps with the another object or a determination that the centroid of the 3-D representation of the object is not within the region, adjust the depth of the object by a predetermined increment or decrement.

* * * * *